United States Patent [19]

Richards

[11] Patent Number: 5,613,993
[45] Date of Patent: Mar. 25, 1997

[54] PROCESS FOR ENCAPSULATING A SHAPED BODY FOR HOT ISOSTATIC PRESSING BY SOL-GEL METHOD

[75] Inventor: Kerry Richards, Abingdon, Md.

[73] Assignee: The United States of America as represented by the Secretary of the Army, Washington, D.C.

[21] Appl. No.: 521,394

[22] Filed: Aug. 29, 1995

[51] Int. Cl.$^6$ .................................................... C03B 8/00
[52] U.S. Cl. .......................... 65/17.2; 427/227; 427/228; 427/296; 427/376.2
[58] Field of Search ................................ 427/227, 228, 427/296, 376.2; 65/17.2

[56] References Cited

U.S. PATENT DOCUMENTS

| | | | |
|---|---|---|---|
| 4,340,619 | 7/1982 | Gaul et al. | 427/228 |
| 4,476,626 | 10/1984 | Moritoki et al. | 65/18.1 |
| 4,540,803 | 10/1985 | Cannady | 556/412 |
| 4,756,977 | 7/1988 | Haluska et al. | 428/704 |
| 5,436,083 | 7/1995 | Halusha et al. | 428/688 |

OTHER PUBLICATIONS

Sol–Gel Processing of Complex Oxide Films, by Guanghua Yi and Michael Sayer, American Ceramic Society Bulletin, vol. 70, No. 7, pp. 1173–1179 Jul. 1991.

*Primary Examiner*—Donald E. Czaja
*Assistant Examiner*—Jacqueline A. Ruller
*Attorney, Agent, or Firm*—Freda L. Krosnick; Muzio B. Roberto

[57] ABSTRACT

There is disclosed a process for encapsulating a preform of arbitrary size and shape for the purpose of manufacturing a body by means of hot isostatic pressing. The preform is encapsulated with glass using a sol gel technique. The glass initially forms a hard, porous layer. Heating the glass in the hot isostatic press results in the formation of a gas-impermeable capsule around the preform.

14 Claims, No Drawings

PROCESS FOR ENCAPSULATING A SHAPED BODY FOR HOT ISOSTATIC PRESSING BY SOL-GEL METHOD

BACKGROUND OF THE INVENTION

1. Field of the Invention

This invention relates to the production of complex components made of metallic or ceramic materials, with powders being used as the starting materials. This invention more particularly relates to an improved process for encapsulating a shaped body in preparation for hot isostatic pressing by coating the body with glass using a sol-gel technique.

2. Description of the Related Art

Powders are used as a starting material in numerous production methods in the metallurgical and ceramic industry. Many manufactured shapes, bodies and parts begin with a fine metallic or ceramic powder. At the start of the manufacturing process, these powders are normally consolidated into a shaped body, generally referred to as a "green body" or "preform." Preforms are made by a variety of known techniques, such as die pressing, cold isostatic pressing, slip casting, extrusion, or injection molding. In the course of the manufacturing process, the starting powders are typically combined with additives, such as binders, lubricants, and sintering aids. Preforms are produced in a shape and size that is close to the desired final shape and size of the body or part being manufactured. The preforms, however, are often mechanically weak and porous.

One common method for consolidating the preform to the required density and shape is known as hot isostatic pressing ("HIP"). During the HIP process, a preform is placed in a pressure vessel, wherein it is heated at a high temperature under high pressure, using a gas such as argon or nitrogen. HIP units frequently operate at temperatures in excess of 2000° C., and at pressures of over 200 MPa.

Because the HIP process is conducted at high temperature and pressure at the same time, the process allows for the production of shapes, bodies and parts that would be difficult, if not impossible, to produce using more conventional means, such as sintering. Since the preform is porous, however, and since the HIP process requires the use of high pressure gas, steps must be taken to prevent the gas from entering the porous preform body. The preforms, therefore, must be sealed with a gas-tight capsule prior to pressurization during the HIP process. In addition, the capsule must be capable of withstanding the high temperatures and pressures associated with the HIP process.

Others have attempted to solve the problem of preform encapsulation by utilizing capsules made of either metal or glass. One such method for encapsulating a preform is known as metal canning. This method requires the fabrication of a metal can in a shape close to the desired shape of the body being manufactured. The metal can is filled with powder and sealed under vacuum. The metal canning technique is problematic, however, when the body being produced is complex in shape or size, because of the difficultly and added expense associated with fabricating a can having similar physical features.

Another known method for encapsulating a preform is by placing the preform in a glass capsule, and then sealing the capsule under vacuum. Like the metal canning method, however, the glass encapsulation method is also difficult to use when the porous preform body has an intricate or uncommon shape.

Still another method for encapsulating a porous preform is to place the preform in a bed of glass powder, and heat the powder until the glass is liquified. After the preform is completely immersed in the liquid glass, the pressure from the HIP may be applied. The increase in cost and complexity associated with this method, however, make the glass bath method undesirable.

It is also known to encapsulate a preform by coating the preform with a glass slurry, and, following the coating, heating the preform under vacuum to drive off the binder and produce a gas tight coating. The glass slurry method, however, has proven to be unreliable in that while the coating is drying, cracks in the coating are likely to occur. Moreover, defects are liable to occur during the removal of the binder by thermal decomposition. Finally, the glass slurry method also adds to the complexity and cost of the manufacturing process.

A sol-gel method may be utilized to produce a thin film of glass. A sol-gel method generally comprises hydrolyzing and polycondensating a metal alkoxide in a solution containing the metal alkoxide, water and an alcohol to form a porous solid material, and heating the porous solid material to produce a glass material. U.S. Pat. No. 5,368,887 (Hoshino), for example, describes one type of process for producing a thin glass film by a sol-gel method. The '887 patent, however, neither shows nor suggests the use of the sol-gel derived glass for encapsulating a preform for the HIP process.

SUMMARY OF THE INVENTION

Accordingly, an object of the present invention is to provide an improved process for encapsulating a preform for the purpose of hot isostatic pressing by utilization of a sol-gel method.

Another object of the present invention is to provide a process of encapsulating a preform that is more versatile than conventional methods, and which may be used with a wide variety of materials, sizes and shapes.

A further object is to provide a process for encapsulating a preform that is simple and less expensive than existing methods.

Other objects and advantages of the present invention will become readily apparent to those skilled in this art from the following detailed description, wherein the preferred embodiments of the invention are shown and described simply by way of illustration of the best mode contemplated for carrying out the invention.

DETAILED DESCRIPTION OF THE INVENTION

According to the present invention, the foregoing objectives and advantages are attained by a process for encapsulating a preform with a sol-gel derived glass, comprising the steps of: coating an outer surface of the preform with one or more layers of a sol mixture, whereupon the sol mixture gels; drying the gel; baking out the preform; and finally, heating the preform under vacuum at a temperature sufficient to seal the sol gel coating to the preform. Once the sol-gel coating is sealed, the preform is capable of withstanding the relatively high pressures and temperatures associated with consolidation during the HIP process. After the body that has been formed by the HIP has become sufficiently cooled, the sol-gel coating may be removed from the formed body.

The process of the present invention may be employed with any of the conventional powders used to make a preform. Preferred examples include titanium nitride, silicon nitride, alumina, and silica. In one example, a preform was initially formed by die pressing the starting powder. After the die pressing, the starting powder was then cold isostatically pressed at approximately 22,000 psi. A number of preforms were produced in the shape of right circular cylinders of approximately ⅜ inch diameter, with lengths varying from ¼ inch to ½ inch. Other preforms were produced in the shape of rectangular bars, whose dimensions were approximately 15 mm×2 mm×6 mm. These rectangular preforms were formed by slip casting. The technique of the present invention, however, is not limited to any particular size or shape of preform. Indeed, neither the chemical composition of the preform, nor the manufacturing process used to produce the preform, is pertinent to the inventive method.

The first step of the present invention comprises producing the sol. The sol may be produced by any conventional technique, and may be either a "high temperature" sol, or a "low temperature" sol (the significance of these two types of sols is described more fully below). For example, one method for making a "high temperature" sol is to mix water and alcohol at 60° C., and add thereto tetraethoxysilane (TEOS). This mixture is then acid-catalyzed, with continuous mixing at 60° C. for approximately one hour.

The next step comprises coating the entire outer surface of the preform with the sol. Because the sol is initially in the form of a liquid, the sol can be applied to a preform of virtually any size, dimension, or shape. The preform may be coated by any means for applying a liquid to a formed body. Preferred means for applying a coating of sol to the preform include dipping, spraying, or painting.

Once applied, the sol gels to the outer surface of the preform, preferably at room temperature (approximately 25° C.) and atmospheric pressure. After the sol has gelled, the sol gel dries at a temperature preferably ranging from approximately 25° C. to 90° C. The dried sol gel forms a hard, porous layer of glass that encapsulates the preform in a three-dimensional, interlocked network, often referred to as a "matrix." The matrix adheres to the surface of the preform. Additional layers of sol-gel derived glass may be applied to the preform by repeating the steps set forth above.

After drying, the coated preform is next placed in a hot isostatic press, wherein it is heated under vacuum conditions to a temperature sufficient to allow for the "baking out" of any binders or lubricants in the preform through the pores of the glass. A preferred bake-out temperature ranges from approximately 500° C. to 800° C.

After the bake-out step, the temperature in the hot isostatic press is raised to a level sufficient to allow the pores of the glass to close, thereby sealing the preform in a gas-tight capsule. The capsule acts as a pressure-transfer membrane, and must be able to withstand the high temperatures and pressures of the hot isostatic press. A preferred sealing temperature ranges from approximately 800° C. to 1500° C.

After the preform has been sealed, the pressure in the hot isostatic press is raised to that required for consolidating the preform into the desired body shape (the "pressure step"). A preferred pressure during the pressure step ranged from approximately 8000 psi to as high as 60,000 psi. During the pressure step, the temperature in the hot isostatic press may be approximately the same as the temperature during the sealing step. In general, however, the preferred pressure step temperature ranged from approximately 1400° C. to 1900° C. The hot isostatic press is maintained under constant conditions of temperature and pressure for approximately one hour, after which the formed body is removed from the press and allowed to cool under ambient conditions of temperature and pressure. Once cooled, the glass coating may then be removed from the formed body.

In another preferred embodiment of the present invention, a step of adding a filler to the sol is performed after the step of mixing the sol, but prior to the step of coating the preform. The filler may be either a "high-temperature filler" or a "low-temperature filler." The application of the different temperature fillers is explained below. Preferred examples of high-temperature fillers are: "VYCOR" scrap ground, then sieved to −325 mesh; fused silica scrap ground, then sieved to −325 mesh; and −325 mesh silica powder. Preferred examples of low-temperature fillers are formed beginning with a starting powder, such as silicon dioxide, aluminum oxide, boron oxide, or sodium carbonate. It should be understood, however, that other starting materials may be used to make an acceptable low-temperature filler.

The low-temperature filler starting powder is dry mixed, heated to 1200° C. for approximately four hours, and quenched with water. Finally, the resulting low-temperature filler material is ground, then sieved to −325 mesh. It is noteworthy that the invention is not limited to these particular high-temperature and low-temperature fillers; many compositions will seal the preform at the desired temperature.

When used with a filler, the matrix functions as a "binder." The matrix binder is preferable in that the matrix need not be removed by baking out prior to the sealing step, since the matrix becomes part of the capsule. Each layer may be made of either sol-gel derived glass or a combination of sol-gel derived glass and filler. The composition of both the sol-gel derived glass and the filler can be tailored to suit the HIP operating environment (bake-out step temperature, sealing step temperature, pressure step temperature and pressure), as well as for compatibility with the preform material.

A slight modification to the inventive process must be employed when utilizing a hot isostatic press that can not operate at high temperature under vacuum, or when utilizing preforms made of materials that break down at high temperature under vacuum. In either of these two scenarios, the capsule must be sealed at a temperature that is much lower than the pressure step temperature (for example, where the bake-out step is conducted at 500° C., the sealing step is conducted at 800° C., and the pressure step at 1500° C.).

Therefore, in another embodiment of the present invention, there is provided a first sol mixture and a second sol mixture. The first sol mixture may comprise solely a high-temperature sol, or the mixture may comprise a "high-temperature" sol and a "high-temperature filler" (examples of which have been provided above). The preferred second sol mixture comprises a mixture of "high-temperature" sol and a "low-temperature filler." An alternative second sol mixture comprises low-temperature sol, which may be (but need not be) mixed with a low-temperature filler.

The preform is then coated with at least one layer (the "inner layer") of the first sol. After the first sol has gelled and dried, the preform is then coated with at least one layer (the "outer layer") of the second sol. For a pressure step temperature of 1500° C., for example, the inner layer could be comprised of sol-gel derived silicon dioxide with a high temperature filler, and the outer layer could be comprised of sol-gel derived silicon dioxide with a low temperature filler.

The composition of the low temperature filler in the outer layer is such that it is of low enough viscosity at 800° C. (the sealing step temperature) that it seals the pores in the silicon dioxide outer layer, but does not seal the pores at 500° C. (the bake-out temperature). The silicon dioxide matrix of the outer layer prevents the melted fill from running off of the preform at the sealing step temperature. As the temperature is increased above the sealing step temperature, the amount of silicon dioxide in the melt increases, increasing the viscosity at that temperature, which prevents the glass from running off of the preform at the pressure step temperature.

After the preform has been coated with the first and second gels, the preform is placed in the HIP chamber, and the process continues with the bake-out step, sealing step, and pressure step, as set forth above.

In yet another preferred embodiment of the present invention, a step of coating the outer surface of the preform with a barrier layer is performed immediately prior to the step of coating the preform with sol. The barrier layer allows for easier removal of the glass capsule from the formed body after cooling. This additional step can be performed regardless of whether a filler material is added to the sol. A preferred barrier layer material is boron nitride.

I claim:

1. A process for encapsulating a preform, prepared from a powder, with glass for the purpose of preparing a shaped body by hot isostatic pressing comprising the steps of:

preparing a mixture comprising a sol and a filler glass having an identical composition as the sol, which gels upon application to a preform, the glass fillers selected from the group consisting of a high-temperature filler and a low-temperature filler:

coating an outer surface of the preform with at least one layer of the sol mixture;

after the mixture has gelled, drying the sol gel coating;

baking out the coated preform;

heating the coated preform under vacuum and at temperature sufficient to cause the sol gel coating to seal the outer surface of the preform; and subjecting the sealed preform to hot isotstatic pressing at high temperatures and pressures in an inert atmosphere.

2. The process according to claim 1, wherein the preform is coated with a plurality of layers of the mixture, and each of the layers is separately dried after each respective layer gels to the preform.

3. The process according to claim 2, wherein each layer of the coating is dried at ambient pressure and temperature.

4. The process according to claim 1, wherein the bake-out step is performed at a temperature ranging from 500° C. to 800° C.

5. The process according to claim 1, wherein the sealing step is performed at a temperature ranging from 800° C. to 1500° C.

6. A process according to claim 1, wherein the filler is selected from the group consisting of a high-temperature filler and a low temperature filler.

7. The process according to claim 6, wherein the high-temperature filler is selected from the group consisting of, fused silica scrap, and silica powder.

8. The process according to claim 6, wherein the low-temperature filler is a glass comprised primarily of silicon dioxide, aluminum oxide, boron oxide, and sodium oxide.

9. process for encapsulating a preform with glass for the purpose of preparing a shaped body by hot isostatic pressing, comprising the steps of:

preparing a first sol which gels on application to a preform comprising a mixture of a high-temperature sol and a high-temperature glass filler:

preparing a second sol which gels on application to a preform comprising a mixture of a high-temperature sol and a low-temperature glass filler;

forming an inner layer by coating the preform with at least one layer of the first sol, and after the first layer has gelled, drying the first gel coating;

forming an outer layer by coating the preform with at least one layer of the second sol, and after the second sol layer has gelled, drying the second gel coating;

baking out the preform;

heating the coated preform under vacuum and at a temperature sufficient to cause the second sol gel coating to seal the outer surface of the preform;

subjecting the sealed preforms to hot isostatic pressing at high temperatures and pressures in an inert atmosphere; and recovering the preforms.

10. A process according to claim 9, comprising the additional step of removing the second sol gel coating from the preform body after hot isostatic pressing of the body has been completed.

11. The process according to claim 9, wherein the first sol comprises a mixture of a high-temperature sol and a high-temperature filler.

12. The process according to claim 9, wherein the second sol comprises a mixture of a high-temperature sol and a low-temperature filler.

13. A method for encapsulating a preform prepared from a powder with glass for the purpose of preparing a shaped body by hot isostatic pressing comprising the steps of:

preparing a mixture comprising a sol and a filler glass having an identical composition as the sol which gels on application to a preform coating the outer surface of the preform with a barrier layer;

coating the preform with at least one layer of the sol mixture;

coating the preform with at least one layer of the sol mixture;

after the sol had gelled, drying the sol gel coating;

baking out the coated preform;

heating the coated preform under vacuum and at a temperature sufficient to cause the sol gel coating to seal the outer surface of the preform; and subjecting the preform to hot isostatic pressing at elevated temperatures and pressures in an inert atmosphere and: recovering the product.

14. The process according to claim 13, wherein the barrier layer comprises boron nitride.

* * * * *